United States Patent Office 3,377,871
Patented Apr. 16, 1968

3,377,871
PORTABLE TIMING MECHANISMS
Paul F. Bechberger, Tenafly, and James A. Howe, Wood-Ridge, N.J., and Milton Brown, New York, N.Y., assignors, by mesne assignments, to United States of America as represented by the United States Atomic Energy Commission
Filed Jan. 18, 1949, Ser. No. 71,404
6 Claims. (Cl. 74—3.54)

This invention relates to a portable timing mechanism and, more particularly, to a spring actuated timing mechanism which can be remotely controlled to effect a desired operation after a preselected lapse of time from the starting thereof.

There are certain operations which require portable timing equipment which is capable of determining with fine accuracy the instant of occurrence of an event after the timing interval is started. Such operations also require that the timing mechanism be adjustable as to the length of the timing interval from a remote point.

The portable timing device of the prior art usually includes a spring motor, a gear train and an escapement mechanism for controlling the angular velocity of the gears in the gear train. This type of mechanism is simple and rugged, and generally satisfactory for measuring relatively long time intervals.

It has been found that the timing devices of the prior art are deficient if applied to timing operations of short duration with an accuracy in the neighborhood of a hundredth of a second.

Another deficiency arises from the failure of the timing mechanisms of the prior art to start with absolute reliability upon the release thereof.

It has been found that the escapement mechanism of the prior art is influenced in its rate of operation by variations in torque applied to the escapement wheel. The torque in a spring actuated mechanism is derived from a spring and therefore varies in accordance with the state of wind thereof. Further, for any condition of wind of the spring, the torque may vary from time to time in the event the spring is subjected to conditions which cause a permanent set.

It is, therefore, an object of the present invention to provide a spring operated timing mechanism in which the torque derived from the spring is nearly uniform throughout the range of the time interval.

It is another object of the present invention to provide an improved escapement which is reliable in action.

Another object is the provision of timing means for effecting desired operations after a selected lapse of time from the instant the mechanism is started.

Another object is the provision of means for accurately presetting the timing mechanism so as to effect a desired operation after a selected interval of time from the instant the mechanism is started.

Still another object is the provision of remotely actuated means for setting a selected time interval.

Still another object is the provision of remotely actuated indicating dials for indicating the time interval for which the timing mechanism is set.

The novel features believed to be characteristic of the invention are set forth with particularity in the appended claims. The invention itself, however, both as to its organization and method of operation, together with further objects and advantages thereof may best be understood by reference to the following description taken in connection with the accompanying drawing in which:

Similar reference characters refer to similar parts throughout the several views of the drawing.

Figure 1:
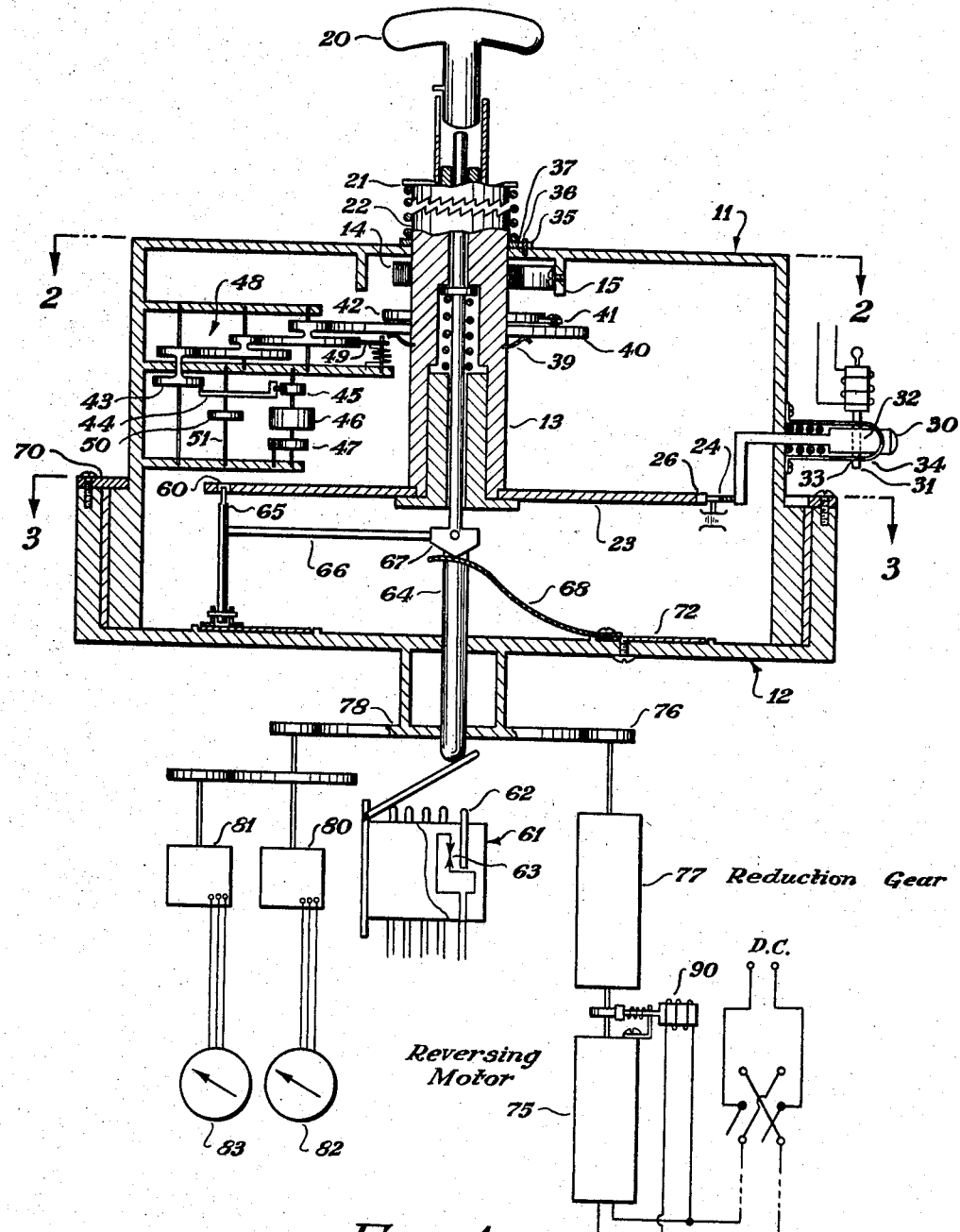
FIGURE 1 is a side elevation of a preferred embodiment of the invention with parts shown in section.

Referring now to the drawings and, more particularly, to FIGURE 1, there is generally indicated a timing mechanism comprising a fixed housing portion 11, and an ajustable housing portion or timing head 12.

For the purpose of providing the necessary torque for actuating the mechanism, a spring arbor 13 is rotatably supported within the fixed portion of the housing and engages the inner end of a spiral main spring 14. The outer end of the spring is attached to the fixed spring housing 15.

Figure 3:
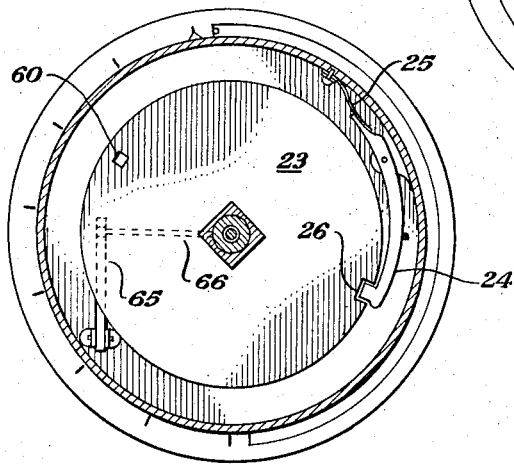
FIGURE 3 is an end view taken on plane 3—3 of FIGURE 1.

The spring wound by turning key 20 after it is inserted into the clutch member 21. Sufficient pressure is exerted to urge the clutch member 21 against the clutch member 22 which is fixed on the end of the barrel arbor. Fixed to the opposite end of the spring arbor is a timing disc 23. This disc has on its periphery a slot 26 so positioned that upon turning the arbor to the fully wound position, the slot coincides in location with the latch portion of latch dog 24. Referring to FIGURE 3, it is seen that the latch dog is normally biased away from the timing disc by spring 25. Therefore, during the winding operation, the plunger 30 is manually pressed downwardly and upon the coincidence of the position of the latch dog and slot 26, the latch dog slips into the slot. The plunger 30 is therefore moved inwardly and is secured in position by the insertion of an arming rod 31 through the aperture 32 and a corresponding aperture 33 in the plunger support 34. It follows that although the timing mechanism is subject to the torque of the wound main spring, it is retained in the starting position for so long as the arming rod 31 remains in position.

In order that uniformity in torque will be derived from the main spring as it unwinds, the device is constructed in accordance with several considerations. A first consideration involves the use of a much larger diameter spring arbor than is usual in the art. The diameter of the spring arbor should be in the neighborhood of not less than 50 times the thickness of the spring.

In order to alleviate friction due to the convolutions of the spring pressing one on the other, the internal diameter of the spring housing is made a function of the length and thickness of the spring. The internal diameter of the spring housing should be in the neighborhood of 3 times the total thickness of the spring if tightly wound, plus the diameter of the spring arbor.

Figure 2:
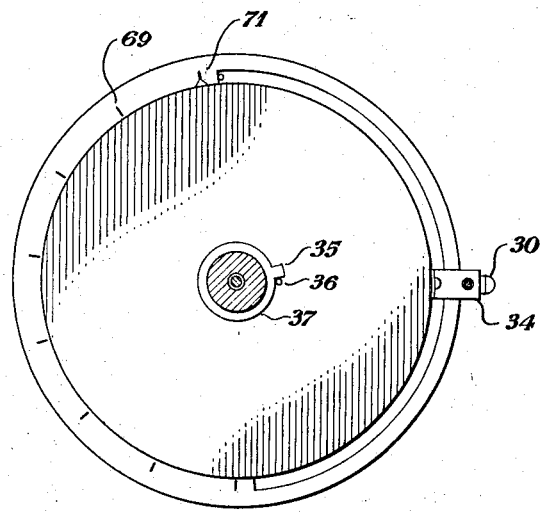
FIGURE 2 is a cross-section on the plane 2—2 of FIGURE 1.

Further, the attainment of such uniform torque as required for high timing accuracy necessitates that the main spring be used in a certain intermediate position of wind and also that it be constrained to operate within a limited motion. For example, with a spring that is tightly wound in six revolutions of wind, the intermediate position of wind which causes the delivery of most uniform torque has been found to be between the third and fourth revolutions of wind from the unwind condition with the spring constrained to operate in the neighborhood of 1 revolution. In order that the main spring will operate in accordance with the foregoing consideration, a stop element 36, shown in FIGURES 1 and 2, is provided adjacent to the spring arbor. A projection 35 on the spring arbor flange 37 engages the stop to limit the rotation of the barrel arbor. To the end that the spring arbor, and therefore the associating timing mechanism, are operated with uniformity over the desired time interval, a train of gears and an escapement is provided. A main gear 40 is rotatably mounted on the barrel arbor 13. This gear is frictionally held in position against the spring arbor flange 42 by spring member 39. A latch dog 41 is provided on the main gear 40 to cooperate with teeth on arbor flange 42 in the event that slippage occurs in the friction contact between the main wheel and arbor flange during a timing operation. On the other hand, the dog 41 does not interfere with a winding operation.

The slow motion of main gear 40 is transmitted with a high step up ratio to an escapement wheel 43 by means of a chain of gears indicated generally by reference numeral 48. Reverse motion of the gear train during winding is prevented by spring load pawl 49.

Figure 4:
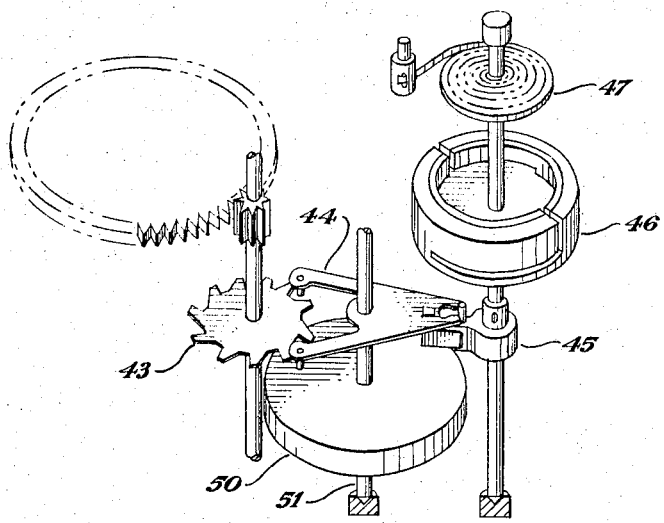
FIGURE 4 is a detailed showing of an improved escapement mechanism used in the device.

The improved escapement mechanism is arranged to insure positive starting. This mechanism is explained with reference to FIGURE 1 and FIGURE 4. The escapement wheel 43 engages the pallet 44 which in turn engages the pallet roller 45 thereby causing a reciprocating angular motion of the balance wheel 46. The angular displacement of the pallet roller, balance wheel, and balance staff causes the hair spring 47 to wind and unwind from a mean position depending upon the direction of the displacement. The winding of the hair spring in either direction from its mean position gives rise to a reverse force which causes the balance staff, balance wheel and pallet roller to move in the opposite direction from the original displacement.

During the operation of the structure thus far recited, the pallet and escapement wheel are locked in position for an instant at the end of each displacement motion. More specifically, the pallet is locked in a position such that one pin is against the locking face of an escapement wheel tooth. It remains this way until the pallet roller 45, moving in a reversed direction, again hits the pallet arm. Sometimes the force supplied by the hair spring and the momentum of the balance wheel is not sufficient to unlock, that is, causes reverse displacement of the pallet. It has been found that placing an additional weight in the form of a disc 50 on the pallet arbor 51, and decreasing the weight of the balance wheel from the usual value, prevents the locking of the pallet at the end of each displacement without causing a decrease in accuracy of the escapement movement. The momentum of the rotating disc on the pallet arbor apparently causes the pallet pins to rebound from the hard surface of the teeth of the escapement wheel.

Thus far, a spring motor having high accuracy and reliability has been described. The structure which is associated with the spring motor to enable a desired operation to be obtained is now described with reference to FIGURES 1 and 3. Assuming that the key 20 has been turned clockwise to the limit determined by the stop element 36 and flange projection 35 on the spring arbor, the slot 26 in the periphery of the timing disc 23 coincides with the position of the latch on latch dog 24. The plunger 30 is pressed down thereby locking in position the timing disc 23. The timing mechanism is so proportioned that the period for a revolution of the timing disc is suitable for any desired operation, but for purposes of explanation, it is assumed that the timing disc requires slightly more than 1 minute to complete a revolution. Located in the timing disc is a square aperture 60. The purpose of this aperture will presently become apparent.

It is desired for the present application of the device that a switch 61 be operated after a selected interval. To this end, the switch is provided with plungers 62 which in the in-position opens contacts 63. The switch 61 is rigidly supported with respect to the fixed portion 11 of the timing device. During the winding operation of the main spring 14, the key 20 is urged inwardly thereby shifting push-rod 64 toward the switch housing thereby opening contacts 63. At the same time that the above operations are executed, the pawl 65 is urged out of the timing disc aperture by means of rod 66 which in turn is secured to the collar 67 on the push-rod 64. The rotation of the spring arbor and timing disc during winding moves the timing disc aperture away from the pawl 65 thereby preventing the plunger 64 from shifting away from switch 61 for the time being.

Although the push-rod 64 is urged away from switch 61 by means of spring 68, it cannot so move as long as the pawl 65 does not coincide in position with the aperture in the timing disc. Pawl 65 is mounted on the adjustable timing head 12 so that its position relative to the position of the aperture in the timing disc can be adjusted. It follows that the angular displacement of the pawl 65 from the position of the aperture on the timing disc determines the duration of time which must elapse between the removal of arming rod 31 and the operation of switch contacts 63. To the end that any desired time interval can be selected, the annular collar 70 which is fastened to the adjustable timing head is provided with calibration marks 69. An index mark 71 is provided on the fixed housing portion 11 adjacent to the calibration marks. In order to permit the operation of the switching mechanism to conform accurately with the calibration marks, the pawl 65 is supported on an angularly adjustable ring 72.

To the end that the timing interval may be selected from a remote point, a reversable motor 75 is provided. This motor actuates a gear 76 through a reduction gear 77. The gear 76 meshes with the gear 78 which is rigidly supported on the timing head 12. It follows that the timing head may be adjusted to increase or decrease the timing interval by control of motor 75 from a remote control point. In order that the value of the time interval will be known at the point of control, a pair of synchro-transmitters 80 and 81 are mechanically coupled to the timing head gear 78. In the preferred embodiment shown in FIGURE 1, the synchro-transmitters 80 and 81 are coupled to the timing head through gears so proportioned that the indicators 82 and 83 show the setting of the timing head in seconds, and tenths and hundredths of seconds respectively. To the end that the timing head will not be altered in position by vibration, and also to prevent over-running of the motor, a magnetic brake 90 is provided to lock the drive mechanism except when the motor is energized.

Although the timing device of the present invention has been described with reference to the operation of an electrical switch, it is obvious that it may be used to effect the operation of other types of devices. Therefore, although the invention has been described with reference to certain specific embodiments, other modifications are possible. Accordingly, it is understood that the invention is to be restricted only by the appended claims as interpreted in view of the prior art.

What is claimed is:

1. A timer for initiating a mechanical movement comprising a clockwork mechanism, a disc rotatably associated with said clockwork mechanism, means for releasibly restraining said disc and clockwork mechanism in start position, operator means supported adjacent said disc and being adapted to move along a path normal thereto, an off-set positioned on said disc intermediate the center and outer periphery thereof to cause translation of said operator means when in contact therewith; and adjustable support means for said operator means whereby the angular displacement between said operator means, and the off-set on the disc in the start position can be selectively adjusted.

2. A timing device comprising a clockwork mechanism having a main shaft, a disc fixedly supported on said shaft and adapted to rotate therewith, a spring coupled to said shaft, and means for winding said spring, means supported adjacent the periphery of said disc to releasibly restrain said clockwork in wound condition, operator means supported adjacent a lateral face of said disc and being adapted to move with a component of motion normal to the lateral face of the disc, means for urging said operator means against the disc, a disfiguration in the lateral face of said disc positioned to cooperate with the operator means when adjacent thereto to cause lateral motion thereof, and means for adjusting the angular position of said operator means with relation to the angular position of said disfiguration in the lateral face of the disc when said clockwork is restrained in wound condition, whereby the intervening time lapse between the removal of restraint from said clockwork and the lateral motion of said operator means can be selectively adjusted.

3. In a timing device, a first housing portion, a second housing portion, a clockwork, a rotatable member supported in the first housing portion and driven by said clockwork, means for releasibly engaging said rotatable member to restrain the rotation thereof, an elongated translation member having a first and a second end supported at the first end by the second housing portion adjacent to the path of said rotatable member and means urging the second end against the rotatable member, a discontinuity in the said rotatable member adapted while rotating to engage the said second end of the translation means to effect the translation thereof, and operator means mechanically coupled to the said translation means whereby an operation is performed after a selected lapse of time from the instant said rotatable member is released to rotate.

4. In a timing device, a fixed housing portion, a timing motor and a rotatable member having a surface of revolution coupled to said motor and supported within said fixed housing portion; a rotatable housing portion, an elongated translation member supported by said rotatable housing and having a portion slidably engaging said rotatable member, said rotatable member having a relieved portion in its surface of revolution positioned in the path of slidable engagement with said translation member, means for rotating said rotatable housing to select an angular distance between the relieved portion of the surface of revolution and the translation member which is equal to a selected fraction of the period of rotation of said rotatable member when released for rotation.

5. In a timing device, a fixed housing portion, a rotation, means for ereleasibly engaging said rotatable member having a surface of revolution, mechanical means for coupling said rotatable member to said clockwork, said mechanical means being suitably proportioned whereby said rotatable member has a desired period of rotation, means for releasably engaging said rotatable member to restrain the same against rotation thereof, elongated translation means having a first and a second end supported at the first end on the rotatable housing portion adjacent to the path of rotation of said rotatable member, means urging the second end of said translation means against the surface of revolution of said rotatable member, an aperture in the rotatable member so positioned that a point in its path of rotation coincides with the said second end of the translation member whereby the time lapse between the instant of release of said rotatable member and the translation of said translation member can be selected to a desired value by positioning the rotatable housing portion so that the time of travel of said aperture from its start position to the position of engagement with the translation member is a selected fraction of the period of rotation.

6. In a timing device, a spring motor including a hollow spring arbor having a winding end and a driven end, a winding member adapted to telescope in said spring arbor, a timing disc coupled to the driven end of the spring arbor, and an operator member; said operator member being slidably supported in the hollow spring arbor and projecting outwardly from the driven end thereof, an elongated translation member having one end supported adjacent to the path of rotation of the timing disc and means for urging the other end thereof against a surface of the timing disc, an aperture in the timing disc positioned in the path of engagement with the translation member, means coupling the translation member to the operator member to effect dependency in motion therebetween whereby the insertion of the winding member in the spring arbor causes simultaneously an axial translation to a projected position of the operator member and the removal of the said other end of the translation member from the disc aperture, and the turning of the winding member rotates the disc aperture away from the translation member thereby causing the retention of the operator in the projected position, means for selectively adjusting the angular position of the translation member with relation to the aperture in the disc when said spring motor is in the wound condition to thereby determine the lapse of time between the start of operation of the spring motor and the axial retraction of the operator member.

References Cited

UNITED STATES PATENTS

| | | | |
|---|---|---|---|
| 286,685 | 10/1883 | Clay | 58—117 |
| 921,280 | 5/1909 | Radtke | 58—24 |
| 2,077,115 | 4/1937 | Knobel | 5—117 |
| 2,166,883 | 7/1939 | Grayson | 161—1 |
| 2,396,523 | 3/1946 | Nelsen | 161—1 |

MILTON KAUFMAN, *Primary Examiner.*

SAMUEL BOYD, JAMES L. BREWRINK, *Examiners.*